United States Patent Office 2,932,282
Patented Apr. 12, 1960

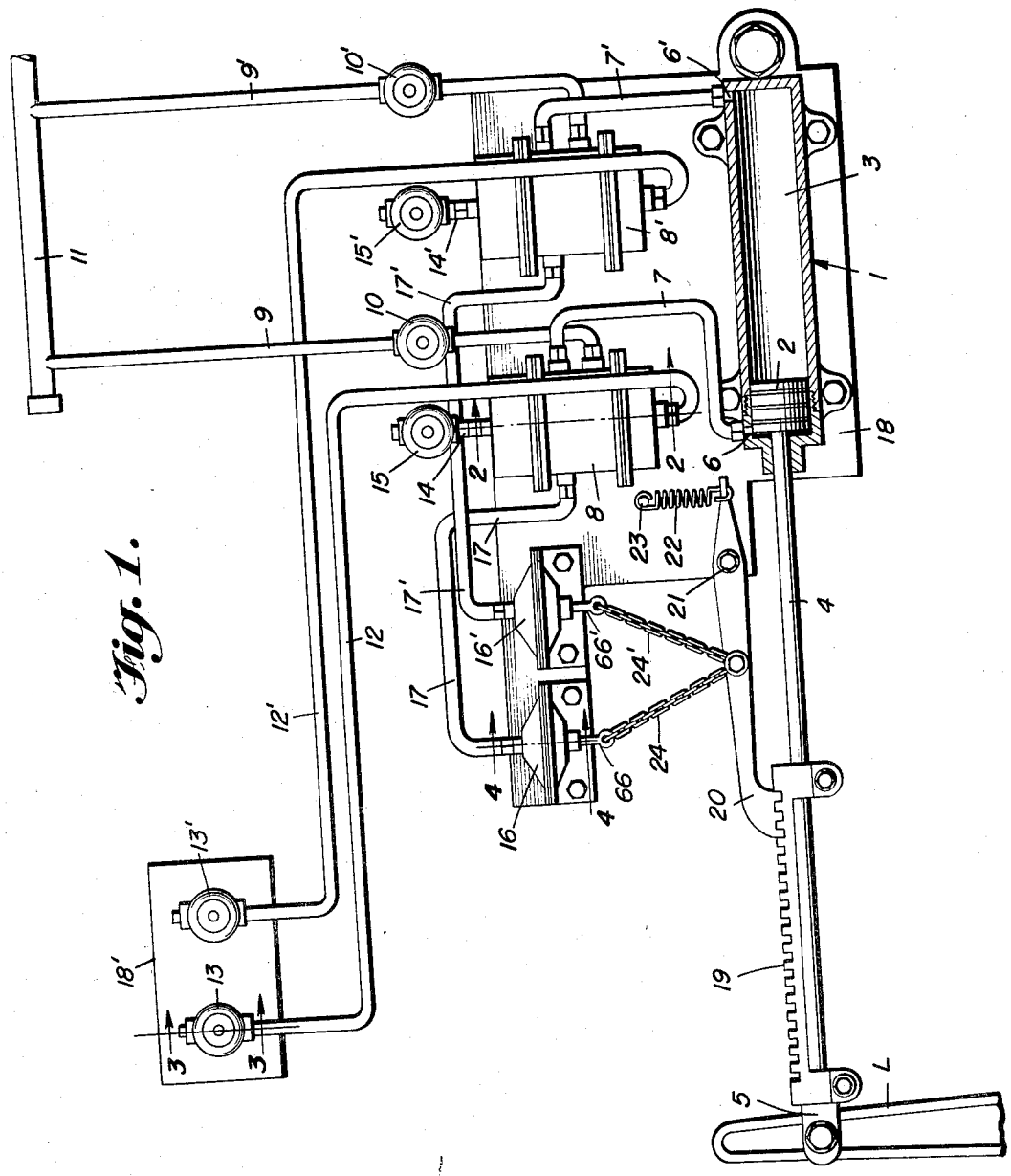

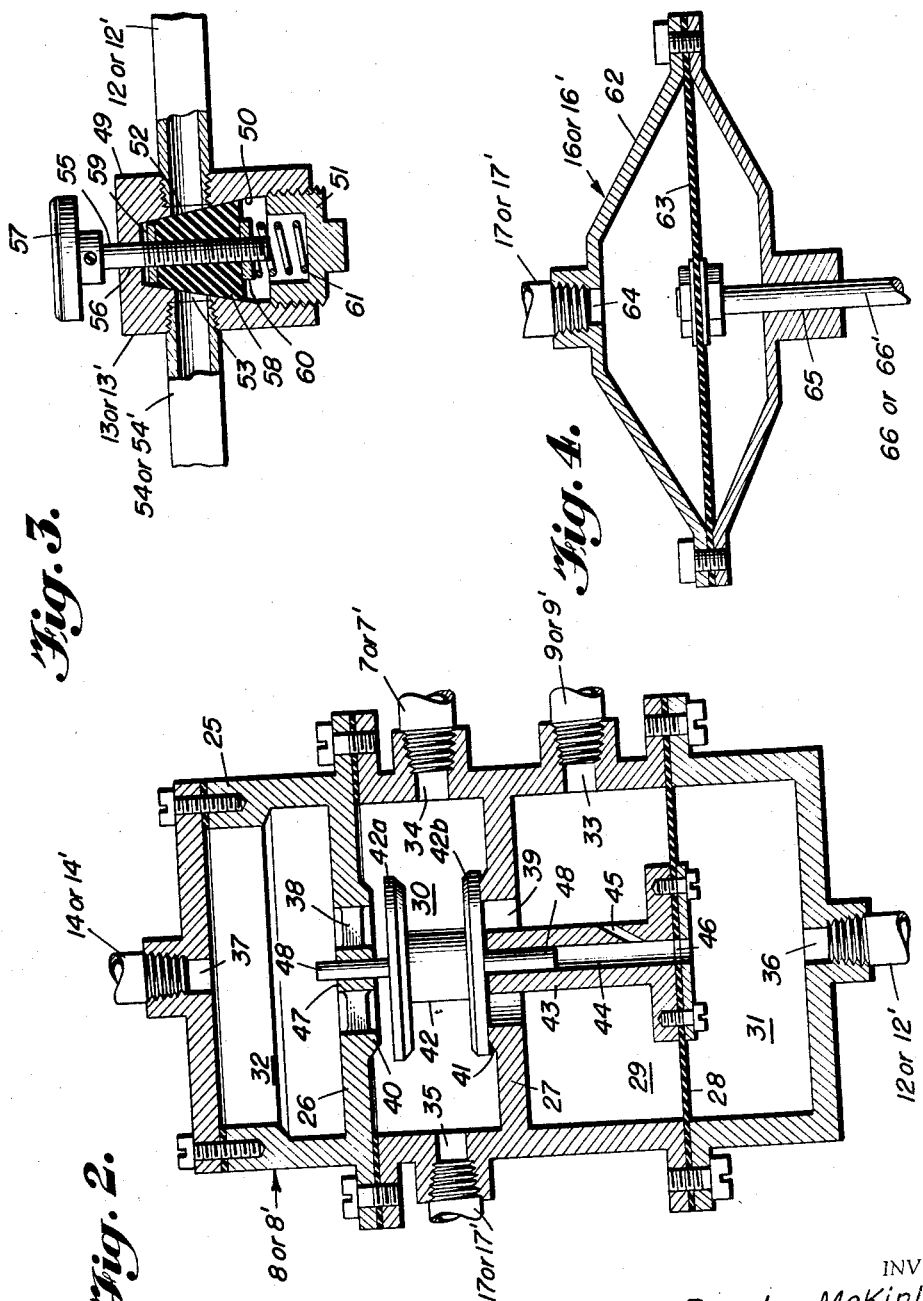

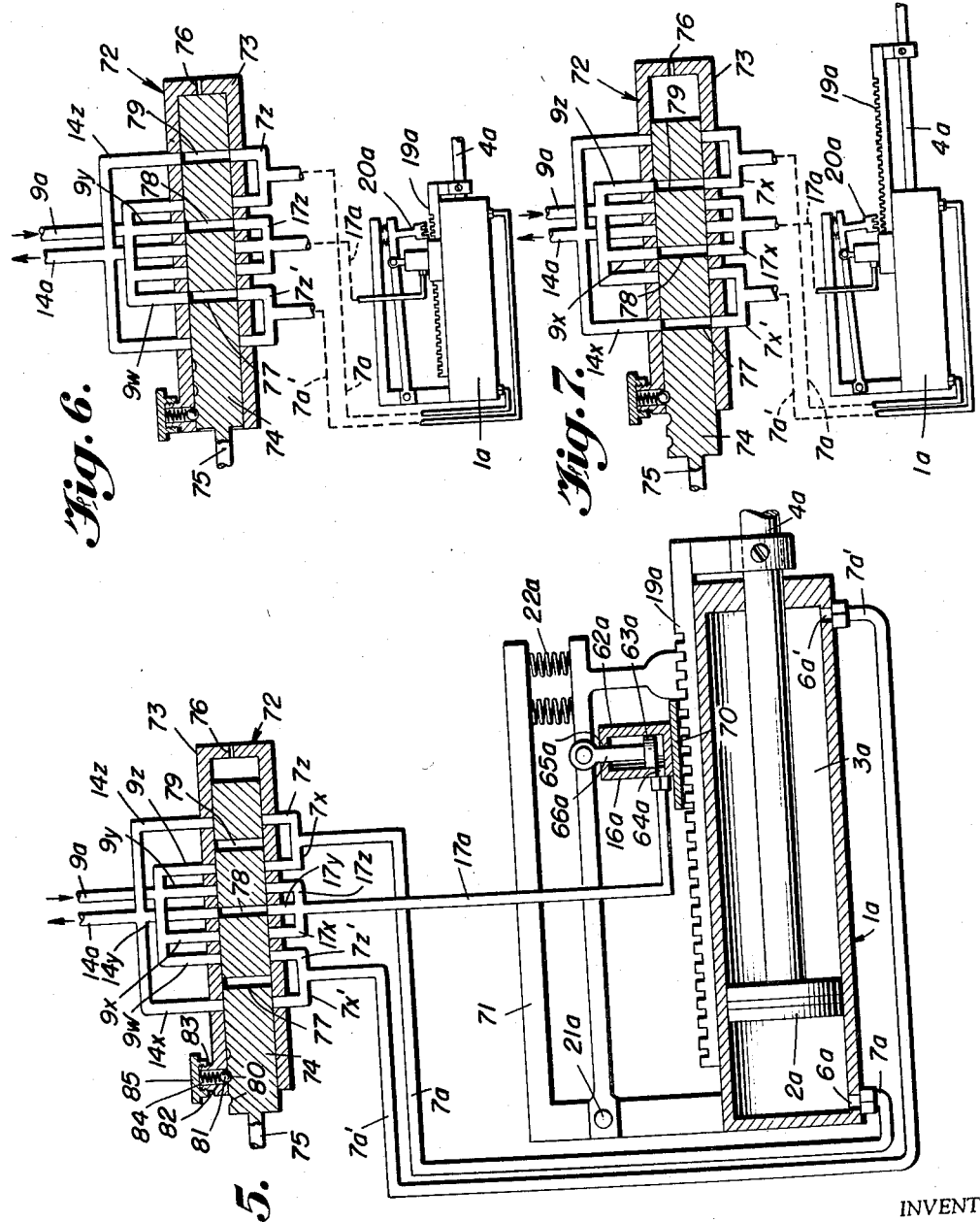

2,932,282

FLUID ACTUATED SYSTEMS FOR OPERATING AND LOCKING CONTROL ELEMENTS

Roe L. McKinley and Jack M. McKinley, Longview, Tex.

Application July 8, 1957, Serial No. 670,497

3 Claims. (Cl. 121—40)

This invention relates to control systems and more particularly to fluid actuated systems for actuating and controlling control elements having a strong reaction to control movements, and especially to such systems that are adaptable to existing equipment.

In the operation of construction, earth moving and like equipment, the control elements of such equipment, such as levers actuated either by hand or foot, are very difficult to operate because of the loads involved. This load may be the weight or load of the parts controlled or the load of a spring mechanism for actuating certain of the parts, such as a clutch. For example, in some of this equipment, the clutch actuating spring involves a pressure of as high as fifty pounds which must be overcome by the operator in releasing the clutch during clutching and declutching operations. Due to the loads involved, actuation of these control members is extremely wearing on the operators or drivers so that frequently this personnel is unable to work more than half a day at a time operating the equipment. Moreover, it is becoming increasingly difficult to obtain the services of competent operators merely because the work is so heavy it is undesirable, despite relatively high wages.

To overcome this problem, it has been proposed to actuate the control elements electronically by means of motors, solenoids and the like. However, such arrangements have proved unsatisfactory in the field in that the services of an electrical engineer are required for maintenance and this is obviously impractical. It has also been proposed to actuate these control systems hydraulically and while these hydraulic systems have been a very decided improvement, they are not the complete answer both because of the wearing of the parts, especially in view of the type of work involved wherein considerable dust and dirt is commonplace, and also because of the fact that the hydraulic system is incapable of rigidly retaining a control element in a fixed position over a period because of leakage of the hydraulic fluid.

Having in mind the defects of the prior art power and control systems, it is the principal object of the present invention to overcome the foregoing difficulties and to provide an easily operable power system for actuating control members or the like.

It is another object of the invention to provide an easily operable power system for actuating control members or the like and which will retain the members in fixed, selected position.

It is still another object of the present invention to provide as a separate auxiliary unit readily adaptable to existing equipment, an easily operable power system for actuating control members of such equipment and retaining such members in fixed, selected position.

It is a further object of the present invention to provide a fluid actuated power system for operating control members and locking such members in fixed, selected position.

It is a still further object of the present invention to provide a finger tip controlled, fluid actuated power system for operating control members and automatically locking such members in fixed, selected position.

It is yet another object of the present invention to provide a power system of the foregoing type and having simplicity of design, economy of construction and efficiency in operation.

The foregoing objects and others ancillary thereto, briefly, are accomplished, in accordance with the present invention, by a fluid actuated, double acting power unit, such as a servomotor, having a power rod with coupling means for attachment to a control member to be operated, a rack associated with said power rod and a pawl normally cooperative with said rack for locking said power rod in selected position, fluid actuated means for releasing said pawl from said rack, and finger pressure actuated means for controlling the flow of fluid to and from both said power unit and said pawl releasing means. While the invention may be incorporated as an integral part of the equipment having the control member to be operated, it is especially adapted as a separate auxiliary unit easily applied to existing equipment, including hydraulically operated equipment, and to be powered by the power unit of such equipment.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Fig. 1 is a more or less diagrammatic layout of a power system in accordance with the present invention;

Fig. 2 is an enlarged cross-sectional view taken on line 2—2 of Fig. 1;

Fig. 3 is an enlarged cross-sectional view taken on line 3—3 of Fig. 1;

Fig. 4 is an enlarged cross-sectional view taken on line 4—4 of Fig. 1;

Fig. 5 is a more or less diagrammatic layout of another embodiment of a power system in accordance with the present invention, and Figs. 6 and 7 are views similar to Fig. 5 but showing the control valve in alternative power supplying positions.

Referring now to the drawings, specifically to Fig. 1, one preferred embodiment of the present invention is shown as especially adapted to be operated by the vacuum created by an internal combustion engine, and comprises a power unit 1, such as a servomotor, constituted by a standard double acting piston 2 operable within a cylinder 3, the piston 2 having a rod 4 extending through one end of the cylinder 3, which rod is provided at its free end with suitable clamping or attaching means 5 for connection to a control lever L of a machine or piece of equipment and that is physically difficult to operate.

The cylinder 3 is provided with a pair of ports 6 and 6' respectively at opposite ends of the cylinder and these ports communicate respectively with tubes 7 and 7' which are respectively connected with distributor units 8 and 8'. These distributor units are respectively connected with vacuum lines 9 and 9' through vacuum regulating valves 10 and 10' of standard design and which are adjustable for regulating the flow of vacuum, the lines 9 and 9' being connected with a main vacuum line 11 that is connectible with a vacuum or suction source, such as the internal combustion engine of the equipment having the control lever L.

The distributors 8 and 8' are also connected with atmospheric control lines 12 and 12' respectively which extend to finger control valves 13 and 13', respectively.

In addition, said distributors are respectively connected with atmospheric exhaust lines 14 and 14' and adjustable atmospheric regulating valves 15 and 15' of standard design and which are adjustable to regulate the exhausting of vacuum in the distributors. Finally, the power system is preferably provided with a locking means and this locking means may be actuated by diaphragm units 16 and 16' respectively connected to the distributors 8 and 8' by lines 17 and 17'.

While this power system may be incorporated in the equipment to which it is applied, it is contemplated that it may constitute an auxiliary apparatus adaptable to existing equipment. For this purpose, the servomotor 1, distributors 8 and 8' and diaphragm units 16 and 16' are mounted on a suitable support or bracket 18 that may be secured on the equipment with the power rod 4 in operative relation to the control lever L. Similarly, the finger control valves are mounted on a separate bracket or support 18' that is adapted to be secured on the equipment adjacent the operator's position. Thus, the entire system is conveniently assembled as a unit that is readily adaptable to any desired equipment.

In fluid operated servomotor power systems, the controlled elements tend to move from the desired position, due to leakage and the like. To overcome this difficulty, the present invention contemplates a locking mechanism for securing the power rod 4 in desired position. This locking mechanism comprises a ratchet 19 on the power rod 4, and a cooperative pawl 20 mounted on a pivot 21 carried by the supporting bracket 18 and biased into locking engagement with the ratchet 19 by a spring 22 reacting against an anchor 23 on the bracket 18.

The pawl and ratchet teeth are preferably square cut to prevent slippage and the pawl 20 is preferably provided with a plurality of teeth so as to have a multiple connection with the ratchet 19. To release the pawl 20 from the ratchet 19 to enable movement of the power rod 4, the pawl must be actuated substantially simultaneously with the action of the servomotor 1. For this purpose, the diaphragm units 16 and 16' are connected with the pawl by flexible connecting elements 24 and 24', respectively, for moving the pawl in opposition to the spring 22.

The distributors 8 and 8' are identical and, as shown in Fig. 2, each comprises a housing 25, conveniently made in four parts, having two ported partitions 26 and 27 and a diaphragm 28. These partitions and diaphragm divide the housing into four chambers including a vacuum chamber 29 between the partition 27 and diaphragm 28, a valve chamber 30 above the vacuum chamber 29 between the partitions 26 and 27, a lower atmospheric control chamber 31 separated from the vacuum chamber 29 by the diaphragm 28, and an upper atmospheric exhaust chamber 32 separated from the valve chamber 30 by the partition 26.

The distributor housing is provided with a plurality of ports connecting the various chambers with the various lines. These ports include an aperture 33 connecting the vacuum chamber 29 with the main vacuum line 9 or 9', two apertures 34 and 35 respectively connecting the valve chamber 30 with the servomotor power line 7 or 7' and the diaphragm unit power line 17 or 17', an aperture 36 connecting the atmospheric control chamber with the finger control valve line 12 or 12', and an aperture 37 connecting the upper atmospheric exhaust chamber 32 with the exhaust line 14 or 14'.

The valve chamber 30 is in communication with the vacuum chamber 29 and the upper atmospheric exhaust chamber 32 by means of ports 38 and 39 in the partitions 26 and 27, respectively. The ports 38 and 39 are respectively surrounded by valve seats 40 and 41 on the valve chamber side of said partitions, and a valve unit 42 is disposed in said valve chamber 30 and has spaced valve elements 42a and 42b which are respectively cooperative with the valve seats 40 and 41. The spacing of the valve elements 42a and 42b is less than the spacing of the valve seats 40 and 41 so that only one of said ports 38 or 39 is closed at a time.

A sleeve 43 is carried by the diaphragm 28 and extends upwardly through the vacuum chamber 29 and axially into the port 39 in the partition 27 between the vacuum chamber 29 and valve chamber 30. The sleeve 43 has a central bore 44 and a small by-pass 45 connecting said bore 44 with the vacuum chamber 29. The diaphragm 28 has an opening 46 in line with the bore 44 and placing the lower atmospheric control chamber 31 in communication through the bore 44 and by-pass 45 with the vacuum chamber 29.

The partition 26 has a spider including an axially disposed bushing 47 spanning the port 38. The valve unit 42 has a central stem 48 extending beyond the valve elements 42a and 42b and one end of said stem 48 is slidably seated within the upper end of the bore 44 of the sleeve 43 while the other end of said stem 48 is slidably seated within the spider bushing 47. Thus, the valve 42 is both slidably supported and guided in its movement by its stem 48 in the sleeve 43 and bushing 47.

The finger control valves 13 and 13' are likewise identical in structure, as shown in Fig. 3. These valves conveniently may comprise a housing 49 which is generally cup shaped and forming a valve chamber 50 which preferably is of a tapered or frusto-conical configuration. The open end of the valve housing 49 preferably is internally threaded to receive a plug 51 for closing the housing and retaining a valve unit therein. The housing 49 is provided with apertures or ports 52 and 53 opening into the tapered walls of the chamber 50 and adapted for communication respectively with the control line 12 or 12' and a nipple 54 or 54' open to atmosphere.

The valve element conveniently may comprise a stem 55 slidably mounted within an axial bore 56 in the housing 49 and having a push button or the like 57 on its outer end. Within the chamber 50, a suitable valve element 58, which may be tapered to correspond to the walls of the chamber 50, is mounted on the stem 55 and conveniently retained thereon by spaced nuts 59 and 60 threaded on the stem 55. Obviously, any suitable means for retaining the valve element 58 on the stem 55 may replace the nuts 59 and 60. Preferably, the plug 51 is cup shaped so that its interior forms a seat for a coil spring 61 which reacts against the nut 60 or the adjacent end of the valve element 58 for normally retaining the valve element in sealing engagement with the walls of the chamber 50 and thereby interrupt communication between the ports 52 and 53.

The diaphragm units 16 and 16' are identical and, as shown in Fig. 4, each constitute a housing 62 which is spanned by a flexible diaphragm 63 and has a port 64 in communication with the vacuum line 17 or 17'. On the opposite side of the diaphragm 63 from the port 64, the housing 62 is provided with an opening 65 through which slidably extends a rod 66 or 66' anchored at its inner end to the diaphragm 63 and connected at its outer end, as shown in Fig. 1, with the flexible connecting element 24 or 24' which is secured to the pawl 20.

In operation, the supporting bracket 18 is fixed on the machine or equipment to be controlled with the power rod 4 in line with the path of movement of the control lever L of the equipment, and the rod 4 is connected with the lever L by the clevis or attaching means 5. The control valve bracket 18' is also fixed on the machine or equipment adjacent and convenient to the operator's position or station. The main vacuum line 11 is connected to the vacuum source of the internal combustion engine powering the machine or equipment.

The vacuum regulating valves 10 and 10' and the atmospheric exhaust regulating valves 15 and 15' are adjusted according to the particular conditions involved so as to increase or decrease the flow of vacuum and atmosphere into the vacuum chambers 29 and exhaust chambers 32, respectively, of the distributors 8 and 8'. In normal or neutral position, the finger control valves 13 and 13' are closed and shut off atmosphere from the control chambers 31 of the distributors 8 and 8'.

In each of the distributors 8 and 8', the valve unit 42 has descended both due to gravity and to vacuum in the vacuum chamber 29 so that the valve element 42b rests on the seat 41 and interrupts communication between the vacuum chamber 29 and the valve chamber 30. As the vacuum chamber 29 and the valve chamber 30. As the control chamber 31 and vacuum chamber 29 are in limited communication through the restricted by-pass 45, conditions in these chambers 29 and 31 are equalized so that the weight of the sleeve 43 and the diaphragm 28 lowers the diaphragm so that the upper end of the sleeve does not interfere with the seating of the valve element 42b.

In the foregoing position, the valve chamber 30 is in communication with atmosphere through the port 38 in the partition 26 and exhaust chamber 32, and the servomotor 1 and diaphragm units 16 and 16' are consequently in communication with atmosphere and in rest or neutral position. Thus, the pawl 20 is biased by its spring 22 into engagement with the ratchet 19, locking the power rod 4 and control lever L in position. The power system is now ready for actuation by the operator of the equipment.

To move the control lever L, it is merely necessary for the operator to actuate one of the finger control valves 13 or 13', depending upon the direction of movement desired. For example, if it is desired to move the control lever L to the left, as viewed in Fig. 1, the operator actuates or opens the finger control valve 13 whereas if it is desired to move the lever L to the right, he opens the finger control valve 13'. The finger control valves 13 and 13' are closed by light springs 61 and may be readily opened merely by finger pressure.

Upon operation of the selected finger control valve 13 or 13' by depression of its button 57, atmosphere is admitted through the respective line 12 or 12' into the respective control chamber 31 and the suction in the vacuum chamber 29 exceeding the limited amount of atmosphere passed through the restricted by-pass 45 causes the diaphragm 28 and sleeve 43 to be lifted, thereby lifting the valve 42 and removing the valve element 42b from its seat 41 and engaging the valve element 42a with its seat 40. This movement of the valve 42 places the vacuum chamber 29 in communication with the valve chamber 30 and interrupts communication between the valve chamber 30 and the upper atmospheric exhaust chamber 32.

When the vacuum chamber 29 and valve chamber 30 are placed in communication, suction is created simultaneously in the main power line 7 or 7' to the servomotor 1 and in the auxiliary power line 17 or 17' to the diaphragm unit 16 or 16' and deflects the diaphragm 63 therein upwardly, lifting the pull rod 66 or 66' and the associated flexible connection 24 or 24' to remove the pawl 20 from the ratchet 19, freeing the power rod 4 and lever L for movement. The flexible connection 24 or 24' that is not operated merely slackens and does not oppose lifting of the pawl.

Simultaneously with the releasing of the locking pawl 20, the suction in the main power line 7 or 7' induces movement of the piston 2 within the cylinder 3 to drive the power rod 4 to move the control lever L in the desired direction. It will be recognized that movement of the piston 2 will not be opposed, except by the resistance of the control lever L, because the side opposite the suction side is in communication with atmosphere because the distributor 8 or 8' connected with such opposite side remains in neutral position and its valve chamber 30 is connected with the exhaust chamber 32.

The servomotor 1 will continue to move the control lever L as long as the operator retains the selected finger control valve 13 or 13' in open position. When the control lever L reaches the desired position, the operator merely releases the valve button 57 to close the valve. Upon closing the finger control valve 13 or 13', atmosphere in the control chamber 31 is exhausted through the by-pass 45 to the vacuum chamber 29 which permits the diaphragm 28 and sleeve 43 to drop to the lower position. This, in turn, permits the valve unit 42 to lower so that the valve element 42b engages its seat 41 to interrupt suction between the vacuum chamber 29 and the valve chamber 30 and also to unseat the valve element 42a from its seat 40 to admit atmosphere from the exhaust chamber 32 to the valve chamber 30 and thereby exhaust the suction from the power lines 7 or 7'. With such neutralization of the system, actuation of the servomotor 1 is stopped and the pawl 20 is biased by its spring 22 to engage the ratchet 19 and lock the power rod 4 and control lever L against slipping.

Obviously, if the device is to be employed in connection with a spring actuated control element such as a clutch lever which is spring pressed toward closing position, then only one distributor 8 and finger control valve 13 is required for operating the control rod 4 against the action of the clutch spring and the port 6' need merely communicate with atmosphere to vent the cylinder 3. In the operation of a clutch mechanism, the locking ratchet 19 and pawl 20 is not necessary as a rule and, therefore, can be dispensed with. If such locking mechanism is required, then a second distributor 8' and control valve 13', or a suitable control connection with vacuum, will be necessary for operating the diaphragm unit 16' to release the pawl 20 during clutching operation.

The foregoing system is especially adapted for operation by suction which conveniently can be the vacuum from an internal combustion engine. Obviously, the system can be adapted for operation by pressure especially with equipment having hydraulic pressure systems. In such an event, modification of the distributor is necessary and as a matter of fact, the distributor and control valve preferably can be incorporated in a single unit. A suitable pressure system is shown in Figs. 5–7 which will now be referred to in detail.

With reference first to Fig. 5, the power unit comprises a servomotor 1a having a piston 2a slidable within the cylinder 3a and actuating a piston or power rod 4a extending through one end of the cylinder 3a for connection with a control member on the equipment in a manner similar to the power rod 4 in Fig. 1. The cylinder 3a has ports 6a and 6a' at opposite ends thereof and these ports are respectively connected with power lines 7a and 7a'. A ratchet 19a is fixed with the power rod 4a and a pawl 20a biased by spring means 22a is cooperative with the ratchet 19a to lock the power rod 4a in selected position.

To afford a more compact design, the ratchet 19a may be formed in the shape of an L with one branch thereof comprising means for fixing it to the power rod 4a and the other branch thereof extending longitudinally over and along the cylinder 3a and through a channel guide 70 mounted on the cylinder 3a. The pawl 20a, cooperative with the ratchet 19a, conveniently is mounted on a pivot 21a carried by an L-shaped bracket 71 having one branch fixed to the cylinder 3a at the end opposite the power rod 4a, the other branch thereof overlying and being generally parallel with the ratchet 19a and the pawl 20a. The spring means 22a are interposed between the pawl 20a and the overlying branch of the bracket 71.

A fluid operated unit 16a for releasing the pawl 20a from the ratchet is shown as a piston and cylinder assembly in lieu of a diaphragm unit although it will be obvious that these units are equivalents and may be substituted without altering the operation of the apparatus. According to this system, only a single fluid operated unit 16a is required for releasing the pawl 20a regardless of the direction of movement of the piston 2a and conveniently this unit 16a comprises a cylinder 62a mounted at one end on the ratchet guide channel 70. A piston 63a is slidable within the cylinder 62a and is connected by a piston rod 66a extending through an aperture 65a in the free end of the cylinder 62a and pivotally connected to the pawl 20a. The cylinder 62a has a single port 64a at the lower end thereof and this port is in communication with an auxiliary power line 17a. Obviously, the servomotor 1a may be provided with support or bracket means for attaching it to the equipment to be controlled with the power rod 4a in operative relation to a control member of such equipment.

The main power lines 7a and 7a' and the auxiliary power line 17a are selectively connected with a pressure line 9a and an exhaust line 14a by means of a combination distributor and control valve 72 which may comprise a cylinder or other housing 73 within which is slidably mounted a piston like valve element 74 having a stem 75 for manual operation of the element 74. The valve element 74 is in fluid-tight engagement with the inner walls of the housing 73 and is also suitably guided therein to prevent relative rotation therebetween. The housing 73 may be open at one end so that the valve element 74 may extend therethrough and at the opposite end, said housing is provided with a vent 76 to preclude resistance to reciprocation of the valve element 74.

The housing 73 has a plurality of ports on relatively opposite sides thereof for respective connection with the power lines 7a, 7a' and 17a, the pressure line 9a and exhaust line 14a, and the valve member 74 has three passages 77, 78 and 79 for selective communication with certain of the ports in the housing 73. The power line 7a has two branches 7x and 7z, the power line 7a' also has two branches 7x' and 7z' and the power line 17a has three branches 17x, 17y, and 17z and each of these branches are connected with respective ports in one side of the housing 73. The pressure line 9a has four branches 9w, 9x, 9y and 9z, while the exhaust line 14a has three branches 14x, 14y and 14z, each of these branches likewise being in communication with respective ports in the housing 73a.

It will be noted that the several branches are in opposed or aligned relation in pairs as follows: 14x and 7x', 9w and 7z', 9x and 17x, 14y and 17y, 9y and 17z, 9z and 7x, and 14z and 7z. The various branches and the valve member passages are in selectively spaced relation so that any one of three conditions can be established by positioning the valve member 74 in any one of three locations. To accurately locate the valve member 74, it preferably is provided with three aligned depressions 80 which selectively receive a ball detent 81 housed within a chamber 82 within a nipple 83 on the housing 73 and enclosing a spring 84 reacting against a nipple cap 85 and biasing the detent 81 toward said depressions 80.

The three positions of the valve member 74 include a neutral position in which the pawl 20a is in engagement with the ratchet 19a and fluid pressure within the servomotor 1a is equalized, a pulling position for retracting the power rod 4a in which the pawl 20a is released from the ratchet 19a and fluid under pressure is supplied the servomotor 1a to force the piston 2a inwardly, and a pushing position in which the pawl 20a is released from the ratchet 19a and fluid under pressure is supplied to the servomotor 1a to eject the power rod 4a.

The neutral position is shown in Fig. 5 and in this position, the valve member 74 is in intermediate position with its passage 78 in communication with the auxiliary power branch 17y and the exhaust branch 14y, the other valve passages 77 and 79 and the other branches being interrupted or out of communication. In this position, the fluid within the servomotor 1a is neutralized or equalized on both sides of the piston 2a and the pawl lifting unit 16a is connected with the exhaust line 14a so that the spring means 22a biases the pawl 20a into engagement with the ratchet 19a and thereby causes the piston 63a to expel fluid from the cylinder 62a through the line 17a to the exhaust line 14a.

In pulling or retracting position, which is shown in Fig. 6, the valve member 74 is fully inserted within the housing 73 and three separate lines of communication are established. The valve passage 77 connects the pressure line 9w with the power line 7z', the valve passage 78 connects the pressure line 9y with the auxiliary power line 17z, and the valve passage 79 connects the exhaust branch 14z with the power branch 7z. In this position, fluid under pressure is fed from the pressure line 9a through the auxiliary power line 17a to lift the pawl 20a from the ratchet 19a and simultaneously, fluid under pressure is supplied to the power line 7a' through the port 6a' into the cylinder 3a to force the piston 2a to the left, as viewed in Fig. 5, while the power line 7a is connected with the exhaust line 14a to permit ejection of fluid from the cylinder 3a through the port 6a.

Obviously, when the power rod 14a has been retracted to move the control member on the equipment to the desired position, the valve member 74 is pulled outwardly from the housing 73 to its intermediate or neutral position to interrupt the power lines 7a and 7a' and place the auxiliary line 17a in communication with the exhaust line 14a, as shown in Fig. 5, so that fluid pressure in the servomotor 1a is neutralized and the pawl 20a is biased by the spring means 22a into locking engagement with the ratchet 19a to lock the power rod 4a and the control member in selected position.

The third or pushing position is shown in Fig. 7 and in this position, the valve passage 77 connects exhaust branch 14x and power branch 7x', valve passage 78 connects pressure branch 9x and power branch 17x, while valve passage 79 connects pressure branch 9z and power branch 7x. In this position, fluid under pressure is supplied to the power lines 7a and 17a so that the pawl 20a is again lifted from the ratchet 19a and fluid under pressure is fed through the port 6a into the cylinder 3a to force the piston 2a to the right, as viewed in Fig. 5, and thereby eject the power rod 4a. Simultaneously, the power line 7a' is placed in communication with exhaust line 14a so that fluid in the cylinder 3a may be ejected through the port 6a'. Again, when the control member has been moved to the desired position, the valve member 74 is returned to the intermediate or neutral position shown in Fig. 5 to neutralize the fluid within the servomotor 1a and exhaust the fluid from the pawl releasing unit 16a.

Although certain specific embodiments of the invention have been shown and described, it is obvious that many modifications thereof are possible and various adaptations may be effected according to the particular circumstances involved. Clearly, the fluid employed in operating the systems may be either gaseous or liquid and although the power element is defined as a servomotor, it may be replaced by any equivalent fluid operated unit, such as a bellows system, actuating a reciprocal power rod. The invention, therefore, is not to be restricted except insofar as is necessitated by the prior art and by the spirit of the appended claims.

That which is claimed as new is:

1. A power system for operating control members, comprising a servomotor, a piston rod actuated by said servomotor and having means for connecting said rod to a control member, a ratchet fixed with said piston rod, a pawl cooperative with said ratchet for locking said rod and retaining the control member in selected position, spring means biasing said pawl into locking engagement with said ratchet, a pair of fluid operated units for releasing said pawl from said ratchet to permit movement of said rod and the control member, and fluid controlling means including a pair of distributors, a pair of finger control valves, and a plurality of fluid passage lines connected to each distributor and including an operating fluid supply line, an exhaust line, a main power line to one end of said servomotor, respectively, an auxiliary power line to one of said fluid operated units, respectively, and a control line to one of said finger control valves, respectively.

2. A power system according to claim 1 wherein each distributor comprises a control chamber in communication with said control line, an operating fluid chamber in communication with said supply line, a diaphragm separating said chambers and providing restricted communication therebetween, a valve chamber in communication with said main and auxiliary power lines, and an exhaust chamber in communicataion with said exhaust line, partitions separating said valve chamber from said operating fluid chamber and said exhaust chamber respectively, said partitions each having a valve port therethrough, a valve member including valve elements respectively cooperative with said valve ports one at a time selectively to place said valve chamber in communication with said operating fluid chamber or said exhaust chamber, and valve operating means carried by said diaphragm.

3. A power system according to claim 2, comprising adjustable regulating valves in said supply and exhaust lines.

References Cited in the file of this patent
UNITED STATES PATENTS

| | | |
|---|---|---|
| 1,124,589 | Casey et al. | Jan. 12, 1915 |
| 1,302,738 | Wallmann | May 6, 1919 |
| 1,847,688 | Couwenhoven | Mar. 1, 1932 |